US010955048B2

United States Patent
McKenzie

(10) Patent No.: US 10,955,048 B2
(45) Date of Patent: Mar. 23, 2021

(54) FUEL ECONOMY ENHANCED TRANSMISSION MANUAL/HOLD MODE AND LOW MODE

(71) Applicant: Eaton Corporation, Cleveland, OH (US)

(72) Inventor: Ian Daniel McKenzie, Kalamazoo, MI (US)

(73) Assignee: Eaton Corporation, Cleveland, OH (US)

(*) Notice: Subject to any disclaimer, the term of this patent is extended or adjusted under 35 U.S.C. 154(b) by 692 days.

(21) Appl. No.: 15/790,443

(22) Filed: Oct. 23, 2017

(65) Prior Publication Data

US 2018/0045304 A1  Feb. 15, 2018

Related U.S. Application Data

(63) Continuation of application No. PCT/US2016/029174, filed on Apr. 25, 2016.
(Continued)

(51) Int. Cl.
*F16H 61/02* (2006.01)
*F16H 59/02* (2006.01)
(Continued)

(52) U.S. Cl.
CPC ..... *F16H 61/0248* (2013.01); *F16H 59/0204* (2013.01); *F16H 59/34* (2013.01);
(Continued)

(58) Field of Classification Search
CPC .. F16H 61/0248; F16H 59/0204; F16H 59/34; F16H 59/44; F16H 59/52; F16H 61/02; F16H 2059/0221
(Continued)

(56) References Cited

U.S. PATENT DOCUMENTS 5,509,322 A * 4/1996 Anderson ........... F16H 59/0204
  74/335
5,819,585 A   10/1998 Darnell
(Continued)

FOREIGN PATENT DOCUMENTS

CN    1148364 A    4/1997
CN    103381817 A  11/2013
(Continued)

OTHER PUBLICATIONS

Chinese Office Action for CN Application No. 201680032973.0 dated Dec. 17, 2018 with English translation, 14 pages.
(Continued)

*Primary Examiner* — Ha Dinh Ho
(74) *Attorney, Agent, or Firm* — RMCK Law Group PLC

(57) ABSTRACT

A method of controlling an automated manual transmission system having a transmission and a shifter is provided. The shifter includes a Drive Mode, a Low Mode and at least one of a Manual Mode and a Hold Mold. The Drive Mode automatically selects a default gear of the transmission and automatically performs all upshifts and downshifts. The Manual Mode permits an operator to manually select an upshift and a downshift of the transmission. The Hold Mode permits an operator to maintain a current operating gear. Control determines whether the shifter is in one of the Manual Mode and the Hold Mode. Control determines whether a vehicle operating condition is outside of a predetermined threshold. Control operates the transmission in Drive Mode based on the vehicle operating condition being outside of the predetermined threshold irrespective of the shifter being in one of the Low Mode, Manual Mode or Hold Modes.

12 Claims, 4 Drawing Sheets

Related U.S. Application Data

(60) Provisional application No. 62/151,485, filed on Apr. 23, 2015, provisional application No. 62/151,635, filed on Apr. 23, 2015.

(51) Int. Cl.
  *F16H 59/44* (2006.01)
  *F16H 59/52* (2006.01)
  *F16H 59/34* (2006.01)
  *F16H 59/70* (2006.01)
  *F16H 61/16* (2006.01)

(52) U.S. Cl.
  CPC ............. *F16H 59/44* (2013.01); *F16H 59/52* (2013.01); *F16H 59/70* (2013.01); *F16H 61/02* (2013.01); *F16H 2059/0221* (2013.01); *F16H 2059/0243* (2013.01); *F16H 2061/022* (2013.01); *F16H 2061/163* (2013.01); *Y02T 10/60* (2013.01)

(58) Field of Classification Search
  USPC .................................. 74/335, 336 R
  See application file for complete search history.

(56) References Cited

U.S. PATENT DOCUMENTS

| | | | | |
|---|---|---|---|---|
| 6,035,735 A * | 3/2000 | Graf | ................... | F16H 59/0204 701/52 |
| 6,076,414 A * | 6/2000 | Tabata | ................... | F16H 59/10 74/335 |
| 6,090,012 A * | 7/2000 | Hollingsworth | ........ | F16H 61/16 477/117 |
| 6,231,477 B1 * | 5/2001 | Hollingsworth | ...... | B60W 10/06 477/107 |
| 7,367,922 B2 * | 5/2008 | Gueter | ................ | F16H 59/0204 477/115 |
| 8,271,166 B2 * | 9/2012 | Wolf | ....................... | F16H 59/02 475/130 |
| 8,512,205 B2 * | 8/2013 | Winkel | ................... | F16H 61/16 477/115 |
| 2006/0276950 A1 * | 12/2006 | Wild | ................... | F16H 61/0213 701/51 |
| 2010/0204007 A1 | 8/2010 | Winkel et al. | | |
| 2012/0199371 A1 | 8/2012 | Sakai et al. | | |
| 2013/0297159 A1 | 11/2013 | Nishida et al. | | |

FOREIGN PATENT DOCUMENTS

| | | |
|---|---|---|
| DE | 19736406 A1 | 3/1999 |
| DE | 102007035297 A1 | 1/2009 |
| EP | 0962683 B1 | 1/2004 |
| WO | 9628317 A1 | 9/1996 |
| WO | 2004081417 A2 | 9/2004 |

OTHER PUBLICATIONS

International Search Report and Written Opinion for International Application No. PCT/US2016/029174 dated Jul. 27, 2016, 14 pages.

European Search Report for EP Application No. 16784074.3 dated Nov. 8, 2018, 10 pages.

\* cited by examiner

FUEL ECONOMY ENHANCED TRANSMISSION MANUAL/HOLD MODE AND LOW MODE

CROSS-REFERENCE TO RELATED APPLICATIONS

This application is a continuation of International Application No. PCT/US2016/029174 filed Apr. 25, 2016, which claims the benefit of U.S. Patent Application Nos. 62/151,485 and 62/151,635 both filed on Apr. 23, 2015. The disclosures of the above applications are incorporated herein by reference.

FIELD

The present disclosure relates generally to transmission shift assemblies and related control strategies.

BACKGROUND

Transmission shift assemblies allow a vehicle operator to selectively change gear ratios during vehicle operation. One transmission configuration is an automated manual transmission. Typically such automated manual transmissions configured for heavy duty trucks can incorporate six through eighteen speeds. In some arrangements automated manual transmissions also provide a manual mode where the driver can manually select the start gear and utilize up and down buttons to shift as desired. Other modes can include a hold mode where a current gear is maintained instead of allowing control to shift gears automatically. Low mode can also be provided. In low mode, downshifts are performed at higher engine RPM's than normal to enhance engine braking. While the manual, hold and low modes provide useful operational advantages to an operator, they can adversely affect fuel economy when they are selected and not necessarily required for a given operating condition.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of controlling an automated manual transmission system having a transmission and a shifter is provided. The shifter includes a Drive Mode, and at least one of a Manual Mode and a Hold Mold. The Drive Mode automatically selects a default gear of the transmission and automatically performs all upshifts and downshifts. The Manual Mode permits an operator to manually select an upshift and a downshift of the transmission. The Hold Mode permits an operator to maintain a current operating gear. Control determines whether the shifter is in one of the Manual Mode and the Hold Mode. Control determines whether a vehicle operating condition is outside of a predetermined threshold. Control operates the transmission in Drive Mode based on the vehicle operating condition being outside of the predetermined threshold irrespective of the shifter being in one of the Manual Mode and the Hold Modes.

According to additional features, the vehicle operating condition is vehicle speed. In another example, the vehicle operating condition is an engaged gear of the transmission. In another configuration, the vehicle operating condition is a fuel delivery rate to an engine providing an input to the transmission. In other examples, the vehicle operating condition is a vehicle grade measurement. The vehicle operating condition can further include a vehicle weight. Control can determine whether the grade is above the threshold for the vehicle weight.

A method of controlling an automated manual transmission system having a transmission and a shifter according to another example is provided. The shifter includes a Drive Mode and a Low Mold. The Drive Mode automatically selects a default gear of the transmission and automatically performs all upshifts and downshifts. The Low Mode performs downshifts of the transmission at higher engine revolutions per minute (RPM) compared to the Drive Mode. Control determines whether the shifter is in the Low Mode. Control determines whether a vehicle operating condition is outside of a predetermined threshold. Control operates the transmission in Drive Mode based on the vehicle operating condition being outside of the predetermined threshold irrespective of the shifter being in the Low Mode.

According to additional features, the vehicle operating condition is vehicle speed. In another example, the vehicle operating condition is an engaged gear of the transmission. In another configuration, the vehicle operating condition is a fuel delivery rate to an engine providing an input to the transmission.

BRIEF DESCRIPTION OF THE DRAWINGS

The present disclosure will become more fully understood from the detailed description and the accompanying drawings, wherein.

DETAILED DESCRIPTION

Figure 1:
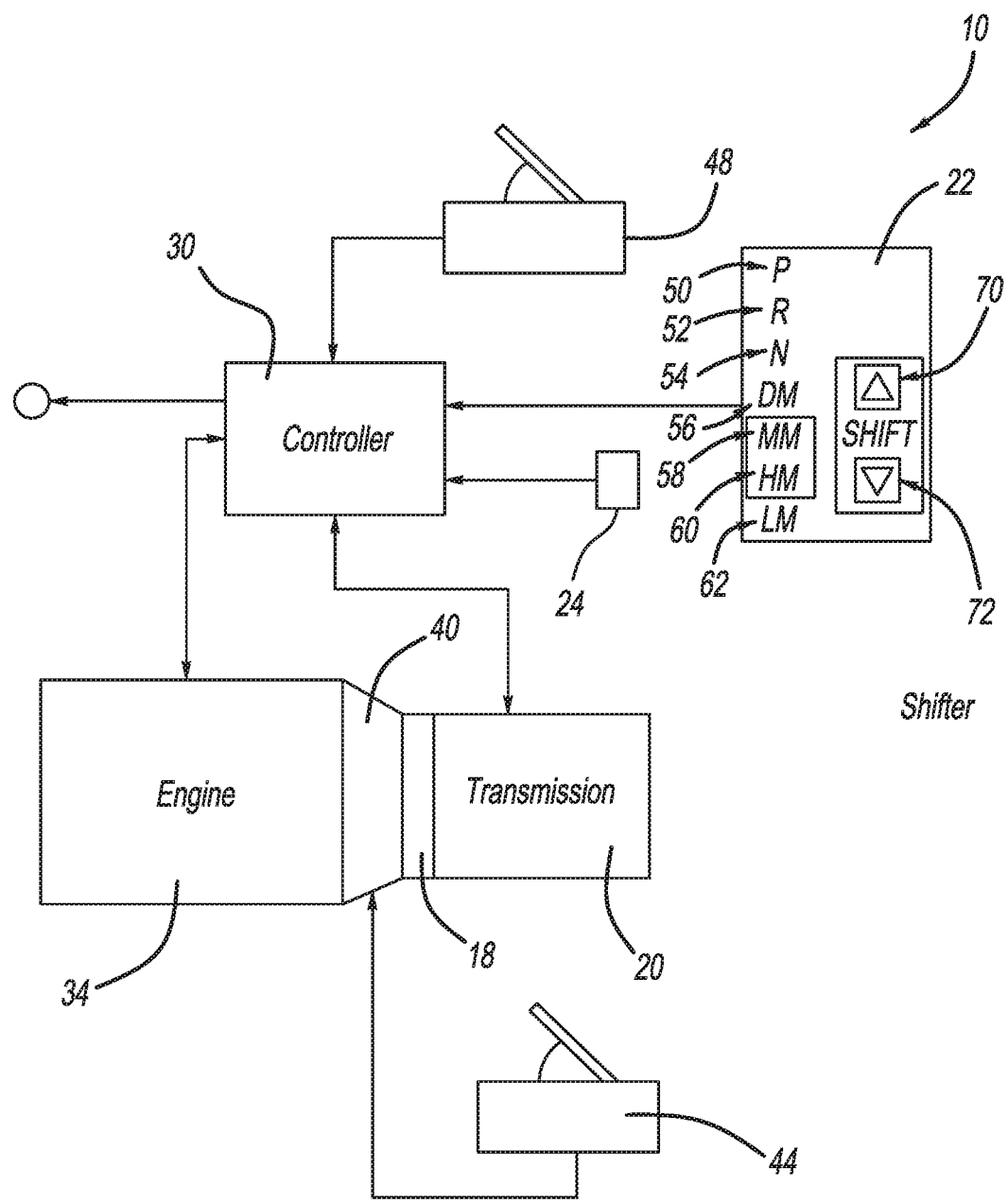
FIG. 1 is schematic illustration of an automated manual transmission system constructed in accordance to one example of the present disclosure.

With initial reference to FIG. 1, an exemplary automated manual transmission system constructed in accordance to one example of the present disclosure is shown and generally identified with reference numeral 10. The exemplary automated manual transmission system 10 can be particularly suitable for application in a medium-duty or heavy-duty truck. However, the present teachings may be adapted for use in other vehicles. The automated manual transmission system 10 can generally include a transmission 20, a gear shifter 22, vehicle operating sensors 24 and a controller 30. The transmission 20 is an automated change-speed or change-gear transmission having a plurality of selectable gear ratios between the input and output shafts thereof, which may be selectively engaged and disengaged by the selective engagement and disengagement of positive jaw clutches. The term "downshift" as used herein shall mean the shifting from a higher speed gear ratio to a lower speed gear ratio. As is known, a lower speed gear ratio (such as $8^{th}$ speed) will have a higher numerical value than a higher gear ratio (such as $9^{th}$ speed). Downshifting includes a downshift by a single ratio, such as a $9^{th}$ speed to an $8^{th}$ speed downshift. The automated manual transmission 20 is driven by a fuel-controlled engine 34, such as a well-known diesel engine, through a non-positive coupling such as a clutch 40.

The automated manual transmission system 10 can additionally comprise a typical foot-operated manual clutch control pedal 44 intended for use only for start-from-rest and/or low speed creeping maneuvering situations. The controller 30 can receive signals indicative of the manual clutch 44 position and of actuation of a vehicle brake pedal 48. Alternatively, the clutch pedal 44 may be eliminated and the operation of the clutch fully automated under the control of the controller 30.

The controller 30 can send and receive communication signals between the engine 34 such as the speed of the engine 34. The controller 30 can send and receive communication signals between the transmission 20 such as information related to the selected gear and various operating speeds. The controller 30 can similarly receive signals from vehicle operating sensors 24 such as vehicle speed.

The gear shifter 22 can be any suitable shifting mechanism that provides the driver various operating modes and gears. The illustration and layout of the shifter 22 in FIG. 1 is merely exemplary. It will be appreciated that the shifter 22 may take other forms and have fewer or additional available gears and modes. The gear shifter 22 can provide Park (P) 50, Reverse (R) 52, Neutral (N) 54, Drive Mode (DM) 56, Manual Mode (MM) 58, Hold Mode (HM) 60 and low Mode (LM) 62. Other gears and modes are contemplated. Further, it will be appreciated that the gear shifter 22 may not include all the modes shown. For example, the gear shifter 22 may not necessarily have both of a Manual Mode 58 and a Hold Mode 60. Drive mode 56 automatically selects the default gear and automatically performs all up and down shifts based on a balance of fuel economy and driver requests. The Manual Mode 58 can also provide up-shift and down-shift buttons 70 and 72. When Manual Mode 58 is selected, the driver can manually select the start gear and push the up-shift and down-shift buttons 70 and 72 to manually select upshifts and downshifts.

Hold Mode 60 can be selected when the driver wants to hold or maintain the current gear instead of letting the controller 30 automatically select the gears. Hold Mode 60 can be useful when moving around a worksite, over railroad tracks, on steep grades or on slippery surfaces for example. Hold Mode 60 can be essentially equivalent to Manual Mode 58 except there are no user up-shift and down-shift buttons available in Hold Mode 60.

Low Mode 62 performs downshifts at higher engine RPM's than normal to enhance engine braking. The downshift point is generally chosen so the engine speed after the shift is below engine rated speed. Low Mode is intended to be used any time the driver desires to maximize engine braking and minimize the use of the brake pedal 48. For example, Low Mode 62 can be used when driving down long grades or when coming to a stop. If Low Mode 62 is selected while moving, the transmission 20 will not upshift, except for transmission override conditions. The transmission 20 will downshift at the earliest opportunity to provide maximum engine braking.

In prior art configurations, drivers can select Manual Mode 58, Hold Mode 60 or Low Mode 62 to circumvent the transmission's Drive Mode 62 logic which selects the most fuel efficient gear. While higher engine RPM's offer the driver more available horsepower, it will be at the expense of fuel economy. As will be described herein, the control system according to the present disclosure allows the use of the Manual Mode 58, Hold Mode 60 and Low Mode 62 for the driver when necessary for a given operating condition.

The control system further inhibits the driver's ability to run the transmission in Manual Mode 58, Hold Mode 60 and Low Mode 62 when the identified operating condition does not require such modes. As a result, the control system provides a more fuel efficient system.

One operating condition where the control system would allow the use of the Manual Mode 58 and Hold Mode 60 can include driving down a grade, or driving at a low speed such as when approaching a railroad crossing. One operating condition where the control system would inhibit the use of Manual Mode 58 and Hold Mode 60 would be driving down a highway at high speeds. As can be appreciated, excess fuel consumption would result from operation in the Manual Mode 58 and Hold Mode 60 while driving down the highway when those modes are not necessary. Other operating conditions can include normal driving speeds where a driver simply desires a lower gear to make available increased horsepower. The control system of the present disclosure therefore attempts to stop a user from operating the transmission 20 in one of the Manual Mode 58 and Hold Mode 60 and Low Mode 62 when those modes are not necessary.

Figure 2A:
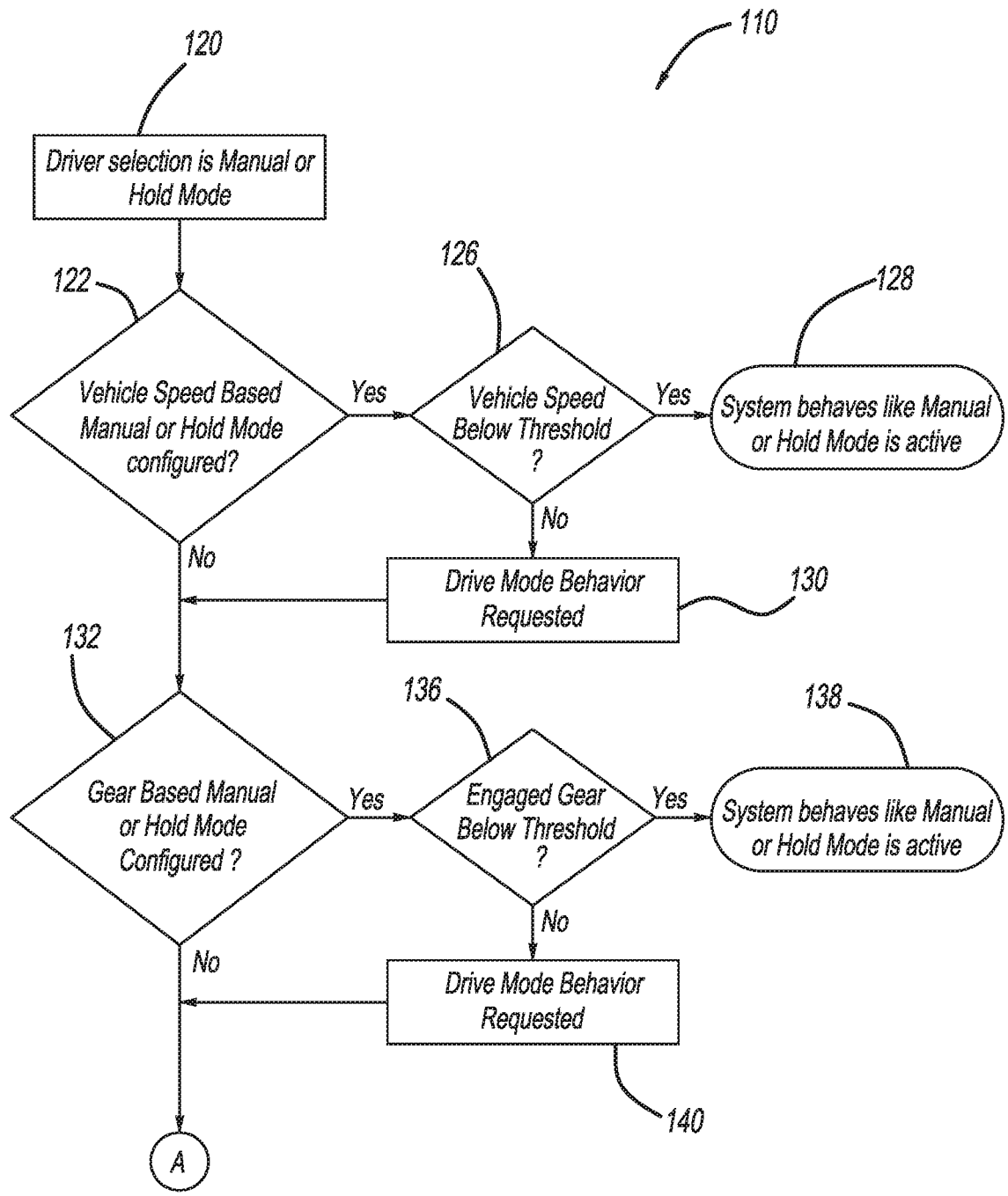
FIGS. 2A and 2B is a method of controlling the automated manual transmission system of FIG. 1 during Manual Mode and Hold Mode.
Figure 2B:
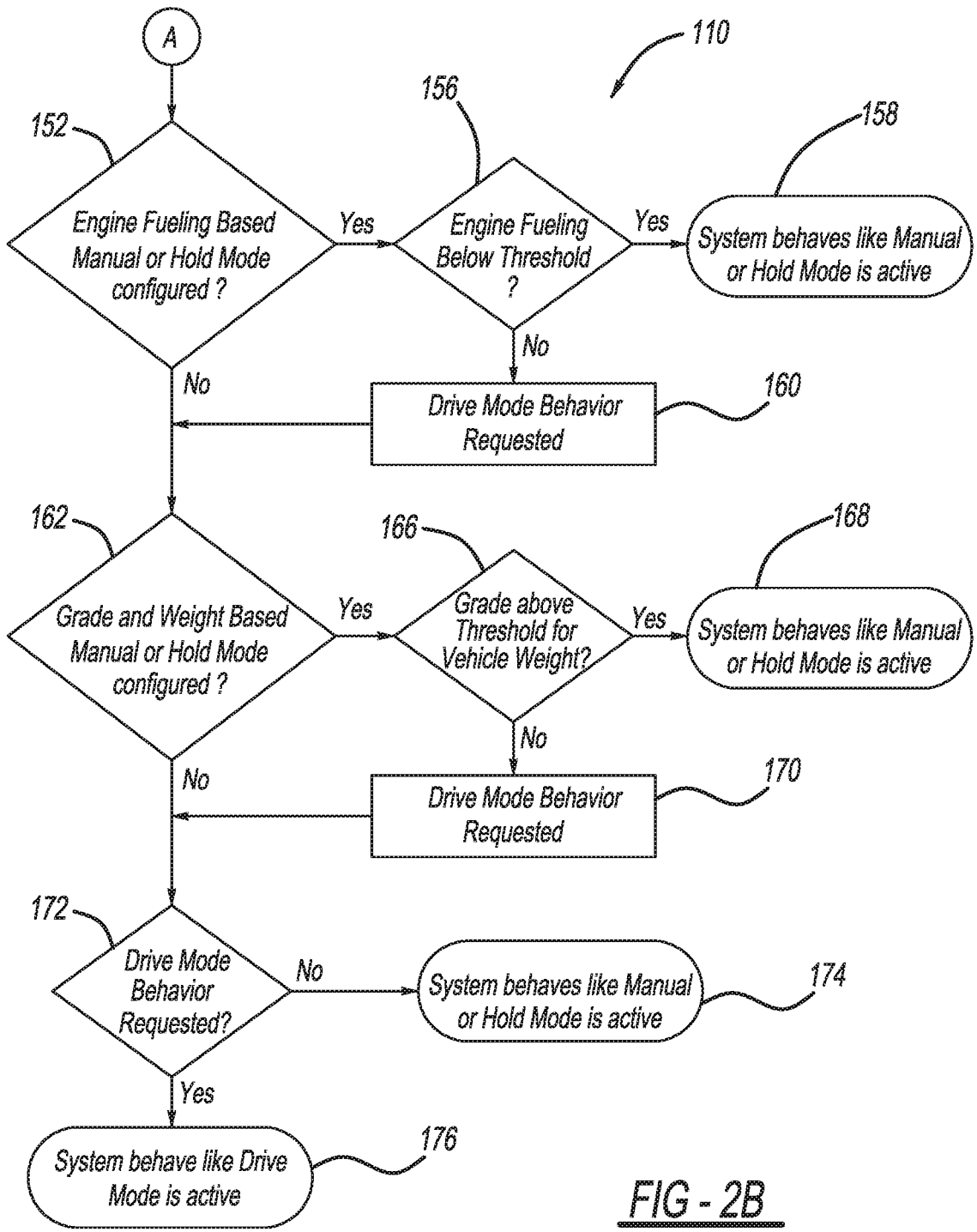

With additional reference now to FIGS. 2A and 2B, a control system 110 used for controlling the automated manual transmission system 10 in Manual Mode and Hold Mode will be described. The control system 110 is configured for use with the Manual Mode 58 and Hold Mode 60. In general, the Manual Mode 58 and Hold Mode 60 can be utilized by a driver until the vehicle speed exceeds a threshold. The transmission 20 will hold the current gear unless otherwise prompted by using the Manual Mode up-shift and down-shift buttons 70 and 72. This ensures that the Manual Mode 58 or Hold Mode 60 functionality is available to meet Federal Motor Carrier Safety Administration (FMCSA) requirements. Further, the benefits of Manual Mode 58 or Hold Mode 60 operation to the driver are extended in maneuvering situations when fuel economy is not the primary concern.

When control determines that the vehicle speed is above a threshold, the Manual Mode 58 or Hold Mode 60 will behave like Drive Mode 56, automatically selecting the optimum gear for fuel economy, acceleration performance, and other concerns. Similarly when control determines that an engaged gear ratio is below a threshold (or selected gear number is above a threshold), the Manual Mode 58 or Hold Mode 60 will behave like Drive Mode 56. In another feature, when control determines that engine fueling (or torque) is below a threshold, the Manual Mode 58 or Hold Mode 60 will behave like Drive Mode 56. In another feature, when control determines that a grade is above a threshold for the vehicle weight, the Manual Mode 58 or Hold Mode 60 will behave like Drive Mode 56. As used herein, "grade above a threshold" is used to denote a large uphill or downhill grade.

At 120, control determines that the shifter 22 is in Manual Mode 58 or Hold Mode 60. At 122 control determines whether vehicle speed based Manual or Hold Mode configured. If vehicle speed based Manual or Hold mode is configured, control determines whether the vehicle speed is below a threshold at 126. In one example, control can receive vehicle speed information from the vehicle sensors 24. The vehicle speed threshold can be set to any speed such as 25 miles per hour (MPH) for example. If the vehicle speed is below the threshold, the automated manual transmission system 10 behaves like Manual or Hold Mode is active at 128. If vehicle speed is not below the threshold, control requests the automated manual transmission system 10 to operate in Drive Mode at 130.

At 132, control determines whether gear based Manual or Hold Mode is configured. If gear based Manual or Hold Mode is configured, control determines whether the engaged gear number is below a threshold at 136. The engaged gear threshold can be set to any low gear number depending upon application. If the engaged gear is below the threshold, the automated manual transmission system 10 behaves like Manual or Hold Mode is active at 138. If the engaged gear number is not below the threshold, control requests the automated manual transmission system 10 to operate in Drive Mode at 140.

At 152, control determines whether engine fueling based Manual or Hold Mode is configured. If engine fueling based Manual or Hold Mode is configured, control determines whether the engine fueling (or torque) is below a threshold at 156. The fuel economy Manual/Hold Mode would behave similarly to the current Manual Mode or Hold Mode when the vehicle is moving with the driveline engaged but the engine 34 not fueling (or fueling at a very low level that is not significant to fuel economy). However, when the vehicle is moving with the driveline engaged and the engine 34 is fueling above a significant level, after a time out period, the fuel economy Manual/Hold Mode would behave similarly to Drive Mode, automatically selecting the optimum gear for fuel economy, acceleration performance and other concerns. If the engine 34 is fueling below a threshold, the automated manual transmission system 10 behaves like Manual or Hold Mode is active at 158. If the engine 34 is not fueling below a threshold, control requests the automated manual transmission system 10 to operate in Drive Mode at 160.

At 162, control determines whether grade and weight based Manual or Hold Mode is configured. If grade and weight based Manual or Hold Mode is configured, control determines whether the grade is above a threshold for the vehicle weight at 166. Again, the threshold can be set to a large uphill or downhill grade depending on application. The fuel economy Manual/Hold Mode would behave similarly to the current Manual Mode or Hold Mode when the vehicle is moving on a steep grade. In one example, the controller 30 can receive grade information from the sensors 24. However, when the vehicle is not on a steep grade, the fuel economy Manual/Hold Mode would behave similarly to Drive Mode, automatically selecting the optimum gear for fuel economy, acceleration performance and other concerns. If the grade is above a threshold for the vehicle weight at 166, the automated manual transmission system 10 behaves like Manual or Hold Mode is active at 168. If the grade is not above a threshold, control requests the automated manual transmission system 10 to operate in Drive Mode at 170. In 172, control determines if drive mode behavior is requested. If drive mode behavior is not requested, the automated manual transmission system 10 behaves like Manual or Hold Mode is active in 174. If drive mode behavior is requested, the system behaves like drive mode is active in 176.

Figure 3:
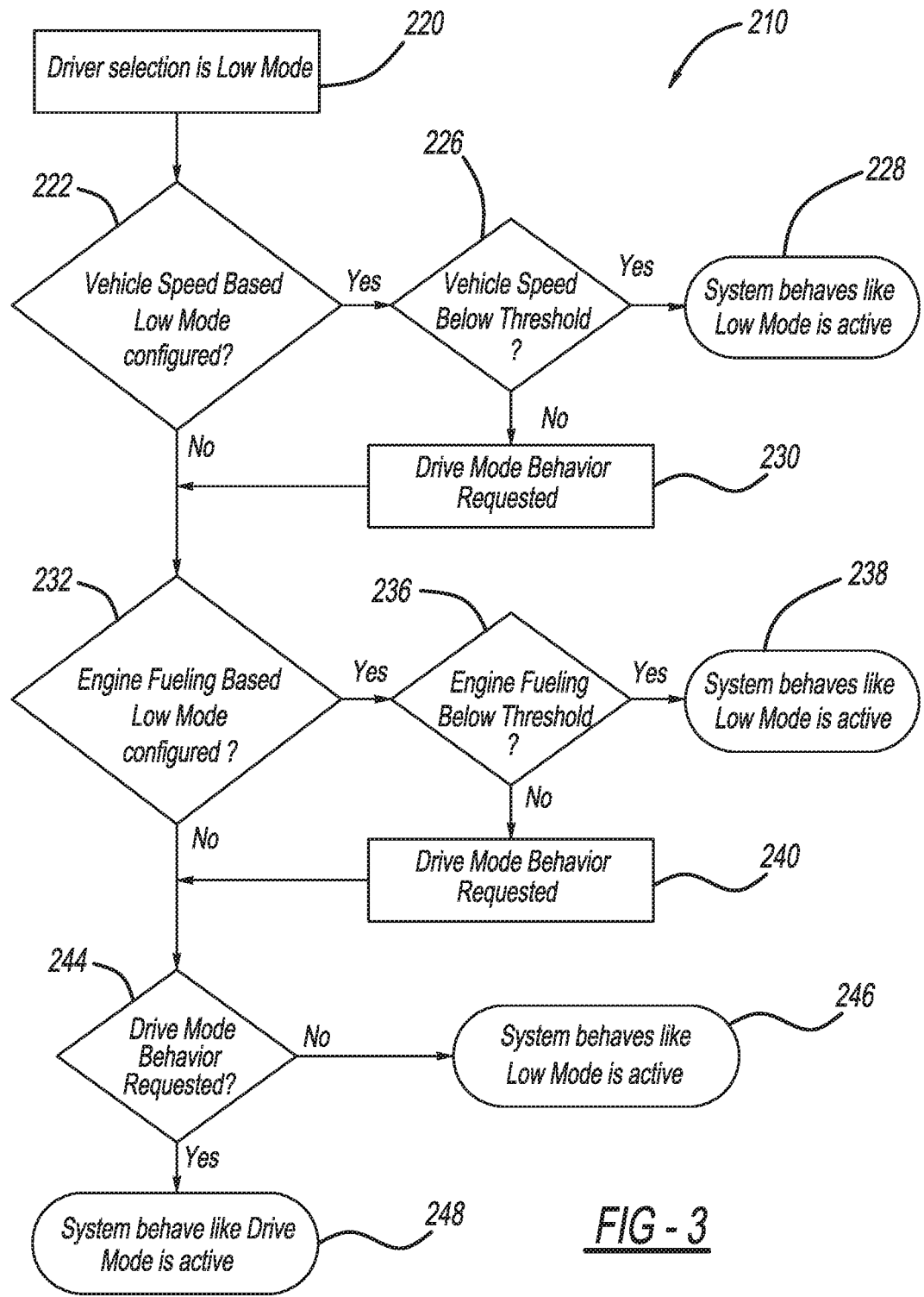
FIG. 3 is a method of controlling the automated manual transmission system of FIG. 1 during Low Mode.

Turning now to FIG. 3, a control system 210 used for controlling the automated manual transmission system 10 in Low Mode will be described. At 220, control determines that the shifter 22 is in Low Mode 62. If vehicle speed based Low Mode is configured, control determines whether the vehicle speed is below a threshold at 226. In one example, control can receive vehicle speed information from the vehicle sensors 24. The vehicle speed threshold can be set to any speed such as 25 miles per hour (MPH) for example. If the vehicle speed is below the threshold, the automated manual transmission system 10 behaves like Low Mode is active at 228. If vehicle speed is not below the threshold, control requests the automated manual transmission system 10 to operate in Drive Mode at 230.

At 232, control determines whether engine fueling based Low Mode is configured. If engine fueling based Low Mode is configured, control determines whether the engine fueling (or torque) is below a threshold at 236. The fuel economy Low Mode would behave similarly to the current Low Mode when the vehicle is moving with the driveline engaged but the engine 34 not fueling (or fueling at a very low level that is not significant to fuel economy). However, when the vehicle is moving with the driveline engaged and the engine 34 is fueling above a significant level, after a time out period, the fuel economy Low Mode would behave similarly to Drive Mode, automatically selecting the optimum gear for fuel economy, acceleration performance and other concerns. If the engine 34 is fueling below a threshold, the automated manual transmission system 10 behaves like Low Mode is active at 238. If the engine 34 is not fueling below a threshold, control requests the automated manual transmission system 10 to operate in Drive Mode at 240. In 244, control determines if drive mode behavior is requested. If drive mode behavior is not requested, the automated manual transmission system 10 behaves like Low Mode is active in 246. If drive mode behavior is requested, the system behaves like drive mode is active in 248.

All of the examples above can be customer configurable. In this regard, the automated manual transmission system 10 can retain traditional Manual Mode or Hold Mode functionality, use the vehicle speed based fuel economy Manual/Hold Mode function, the gear based fuel economy Manual/Hold Mode function, the engine fueling based fuel economy Manual/Hold Mode function, the grade based fuel economy Manual/Hold Mode function, or any combination of the features. Additionally, the controller 30 can be configurable to accept various speed thresholds, grade thresholds, fueling thresholds etc.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A method of controlling an automated manual transmission system having a transmission and a shifter providing a Drive Mode and at least one of a Manual Mode and a Hold Mode, the Drive Mode automatically selecting a default gear of the transmission and automatically performing all upshifts and downshifts, the Manual Mode permitting an operator to manually select an upshift and a downshift of the transmission, the Hold Mode permitting an operator to maintain a current operating gear, the method comprising:

determining whether the shifter is in one of Manual Mode and Hold Mode;

determining whether a vehicle operating condition is outside of a predetermined threshold; and operating the transmission in Drive Mode based on the vehicle operating condition being outside of the predetermined threshold irrespective of the shifter being in one of the Manual Mode and Hold Modes;

wherein the vehicle operating condition is a vehicle grade measurement and a vehicle weight, wherein control determines whether the vehicle grade measurement is above a predetermined threshold for the vehicle weight.

2. The method of claim 1 wherein the vehicle operating condition further includes vehicle speed.

3. The method of claim 1 wherein the vehicle operating condition further includes an engaged gear of the transmission.

4. The method of claim 1 wherein the vehicle operating condition further includes a fuel delivery rate to an engine providing an input to the transmission.

5. A method of controlling an automated manual transmission system having a transmission and a shifter providing a Drive Mode and a Low Mode, the Drive Mode automatically selecting a default gear of the transmission and automatically performing all upshifts and downshifts, the Low Mode performing downshifts of the transmission at higher engine revolutions per minute (RPM) compared to Drive Mode, the method comprising:
  determining whether the shifter is in Low Mode;
  determining whether a vehicle operating condition is outside of a predetermined threshold; and
  operating the transmission in Drive Mode based on the vehicle operating condition being outside of the predetermined threshold irrespective of the shifter being in Low Mode;
  wherein the vehicle operating condition is a vehicle grade measurement and a vehicle weight, wherein control determines whether the vehicle grade measurement is above a predetermined threshold for the vehicle weight.

6. The method of claim 5 wherein the vehicle operating condition further includes vehicle speed.

7. The method of claim 5 wherein the vehicle operating condition further includes an engaged gear of the transmission.

8. The method of claim 5 wherein the vehicle operating condition further includes a fuel delivery rate to an engine providing an input to the transmission.

9. A method of controlling an automated manual transmission system having a transmission and a shifter providing a Drive Mode, a Low Mode and at least one of a Manual Mode and a Hold Mode, the Drive Mode automatically selecting a default gear of the transmission and automatically performing all upshifts and downshifts, the Manual Mode permitting an operator to manually select an upshift and a downshift of the transmission, the Hold Mode permitting an operator to maintain a current operating gear, the Low Mode performing downshifts of the transmission at higher engine revolutions per minute (RPM) compared to Drive Mode the method comprising:
  determining whether the shifter is in one of Manual Mode, Hold Mode and Low Mode;
  determining whether a vehicle operating condition is outside of a predetermined threshold; and
  operating the transmission in Drive Mode based on the vehicle operating condition being outside of the predetermined threshold irrespective of the shifter being in one of the Manual Mode, Hold Mode and Low Mode;
  wherein the vehicle operating condition is a vehicle grade measurement and a vehicle weight, wherein control determines whether the vehicle grade measurement is above a predetermined threshold for the vehicle weight.

10. The method of claim 9 wherein the vehicle operating condition further includes vehicle speed.

11. The method of claim 9 wherein the vehicle operating condition further includes an engaged gear of the transmission.

12. The method of claim 9 wherein the vehicle operating condition further includes a fuel delivery rate to an engine providing an input to the transmission.

\* \* \* \* \*